United States Patent [19]
Justus

[11] 3,996,738
[45] Dec. 14, 1976

[54] GAS TURBINE CIRCUIT SYSTEM

[76] Inventor: Siegfried Justus, An der Juch 76, 507 Bergisch-Gladbach, Germany

[22] Filed: Apr. 11, 1975

[21] Appl. No.: 558,351

[52] U.S. Cl. .......................... 60/39.16 R; 60/39.52
[51] Int. Cl.² ......................................... F02C 7/02
[58] Field of Search ............ 60/39.52, 39.51 R, 39.16, 60/650; 417/88, 159

[56] References Cited
UNITED STATES PATENTS

| | | | |
|---|---|---|---|
| 3,125,855 | 3/1964 | Kofink et al. ..................... | 60/39.52 |
| 3,621,654 | 11/1971 | Hull ................................. | 60/39.51 |
| 3,630,022 | 12/1971 | Jubb ................................ | 60/650 |

FOREIGN PATENTS OR APPLICATIONS

| | | | |
|---|---|---|---|
| 648,907 | 8/1937 | Germany ......................... | 60/39.52 |
| 460,206 | 11/1950 | Italy ................................ | 60/39.52 |

Primary Examiner—Carlton R. Croyle
Assistant Examiner—L. J. Casaregola

[57] ABSTRACT

A gas turbine circuit system in which the individual heat exchanging components are never subjected to maximum temperature and maximum pressure simultaneously so to reduce maximum stress for the component material, a feed back circuit from the outlet of the first turbine stage back to the heat source gas inlet comprising a mixing path in which the operational hot gas is mixed with injected cold gas under high pressure and substantial pressure-gain for the hot gas.

1 Claim, 2 Drawing Figures

GAS TURBINE CIRCUIT SYSTEM

The present invention relates to a gas turbine circuit system and in particular to a gas turbine circuit system for vehicle drive means and for extracting energy from a nuclear reactor.

Gas turbine circuit systems are generally known. In the known systems, however, usually recuperative or regenerative heat exchangers are provided. Such heat exchangers, at first, occupy a considerable volume which cannot substantially be reduced even if the gas pressure is increased because of the exchange path length being alomost independent of the system pressure. Moreover, such heat exchangers are necessarily subjected to extremely high temperatures so that they cannot be shielded thereagainst.

It is the object of the present invention to provide a gas turbine circuit system in which, in the high temperature part, heat exchangers for said purposes are eliminated. It is a further object of the invention to provide such a system which permits very high operational gas temperatures under quite economic conditions.

The principles of the invention will be explained hereunder with reference to the accompanying drawings in which.

Figure 1:
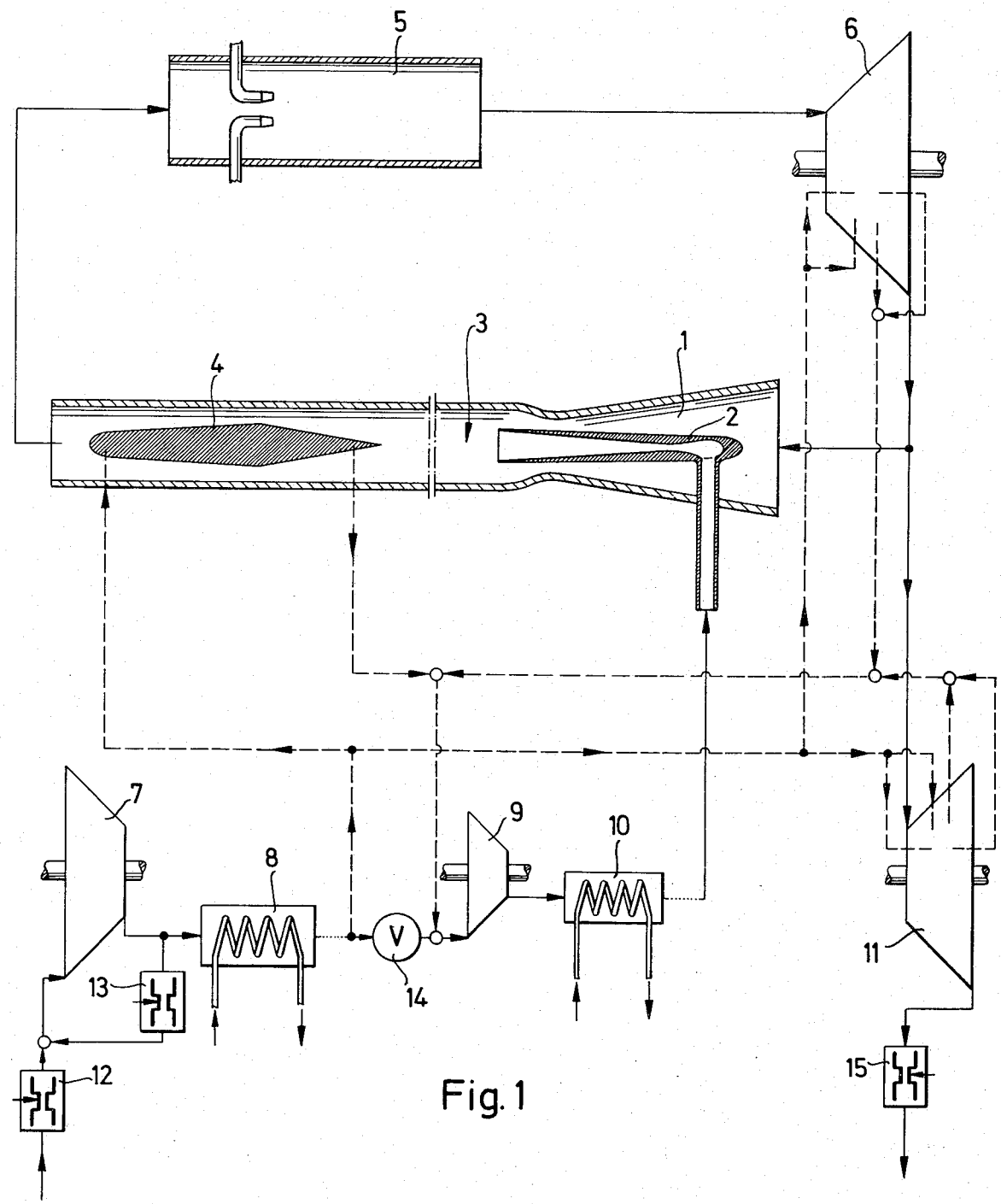
FIG. 1 shows the block diagram of a first embodiment of the invention.

It is to be noted that the individual components or ducts indicated in the drawings do not necessarily represent their acutal design but are rather symbolic, and unless specifically mentioned hereafter, the design of such components is obvious for an expert skilled in the art.

Referring to FIG. 1, there is shown the funtional circuit diagram of a vehicle drive turbine system. There is a main circuit comprising a Laval nozzle 1, a recompressing unit 4, an internal combustion chamber 5, and a main turbine 6. This main circuit is fed with fresh, cold air via a first compressor 7, a heat exchanger 8 for removing heat from the gas compressed by compressor 7, a second compressor 9 followed by a similar cooling heat exchanger 10, the latter discharging into Laval nozzle 2.

The corresponding quantity of combustion air is discharged from the system via discharge turbine 11.

With reference to the drawing so far explained the basic principle of the invention may be characterized as follows:

Compressor 7 is designed to pressurize the cold air to a value somewhat exceeding the combustion chamber pressure, the latter being determined by the efficiency requirements of the discharge turbine 11 and may be assumed to, say, 80 atmospheres for maximum load. Cooled down by heat exchanger 8, the air will be further compressed by, say, a factor of 10 such that it will assume (once being cooled down by heat exchanger 10) in the Laval bozzle 2 a supersonic velocity approximately equal to the supersonic velocity which the hot air assumes in Laval nozzle 1, equal static pressure being supposed. The Mach figure of the cold air supersonic flow may be about 2 while the Mach figure of the unmixed hot air supersonic flow may be 1,1. Upon mixing of the gases in mixing unit 3 and with equal flow velocity — neglecting friction losses — the temperature of the hot air will be reduced. This in turn means with the recompressing of the hot gas a higher pressure will be achieved than observed downstream of the main turbine 6, and a factor of 2 may be obtained as may be demonstrated by calculation.

The very objective of the invention is, of course, to have a maximum efficiency with a minimum of space for the system components. According to the principle formula of the thermodynamic art, the ideal efficiency is given by $$i_d = (T_1 - T_2)/T_1$$

If $T_1$ is assumed to be 1600°K and $T_2 = 400°K$, the ideal efficiency $i_d$ will be 75%. In order to realize gas temperatures according to the assumed $T_1$, an auxiliary circuit is necessary indicated in FIG. 1 with dashed lines. This circuits serves the purpose to cool, via valve 14, compulsorily the main turbine and discharge turbine rotors and entrance buckets as well as the body 4 of the recompressing unit, the named components being just examples because others must be cooled, too, as the case may be.

Valve 14 is shown, of course, in the main gas path only as an example. In practice one will have the throttle 14 in the cooling path and will feed back the cooling gas, say one stage upstream into compressor 7 to avoid unnessesary pressure-drop-losses.

In the cooler regions of the main circuit, i.e. in Laval nozzle 1, mixing chamber 3 and recompressing body 4, the pressure-resistant walls are lined with a chromium-aluminum-iron alloy which, in a well known manner, is corrosion resistant against air up to temperatures of 1200° C. Between the carrier material and the lining, a clearance of some tenths of a millimeter is provided by a wafer-like structure and a perforation apt to avoid compulsory convection. Due to these measures, the temperatures of the carrier material may be decreased to a tolerable value. Most care is to be taken where those parts of the Laval nozzle 2 subjected to high static pressure is to be shielded against the hot air jet of Laval nozzle 1.

The highest temperatures will be found in combustion chamber 5, the latter therefore being suitably lined with a ceramic material. Following the same rules as outlined above for the Cr-;1-Fe-alloy, it will be possible to support the ceramic refractories elastically such that the temperature gradients will be tolerable.

Considerable centrifugal forces will be generated in the running blades of the turbines. Therefore, these are made of a sintered chromium alloy providing a suitable porosity. Since, the compressor 7 will pressurize the cold air to a higher pressure than the static pressure at the running blades, injection of cold air into the flow interface of the running blades will be possible, thereby decreasing the temperature thereof.

The circuit system shown in FIG. 1 is primarily provided for driving vehicles, in particular automobiles. Vehicles, however, must be operated under partial load conditions for a considerable portion of the overall operational period while, simultaneously, high acceleration must be provided, and the vehicle must be apt to be decelarated quickly. Hence the machine control is of importance. One will try to eliminate excessive temperature variations which could cause excessive material stress, and for this reason one will use the quantity control rather than quality control for the combustion fuel. Thus, FIG. 1 shows throttle 12 combined with feed back throttle 13, the latter being provided to avoid excessive suction cooling.

Consideration of the partial load operation will permit comprehension of a very important advantage of the invention. If one considers components solely which are usually provided in a turbine circuit, i.e. combustion chamber 5, discharge turbine 11, entrance throttle 12, compressor 7, heat exchanger 8, and compressor 12. It will be appreciated that, with the cooling and heat shielding means outlined above, a relatively good efficiency would be achieved under maximum load conditions. Because of the throttling control, however, the performance of the compressors 7 and 9 would be approximately proportional to the system reference pressure which is defined, for example, as the static combustion chamber interior pressure. The performance of turbine 11, on the otherhand, would vary super-proportionally with respect to the reference pressure because of the variable adiabatic drop. In result, the efficiency during partial load operation would be considerably decreased.

This is not true, however, for the system according to the invention. Indeed, since components 1, 2, 3 and 4 combine to produce an approximately constant compression ratio the performance of turbine 6 will consequently be proportional the reference pressure, too. Assuming a power ratio between turbine 6 and turbine 11 at unity for maximum load, this ratio will be considerably higher under partial load conditions or, in other words, the good efficiency of the system is maintained. These considerations include that in a manner known per se for gas turbines of variable performance compressor driving turbines and output power turbines are mechanically separated. When using gearings of constand speed ratio, the high compressing ratio may be realized by compressors of almost constant speed.

The individual data of all the components are readily known by experts skilled in the art so that the calculations need not be explained in detail. Perhaps, with regard to the recompression unit 4, one may refer to the publication of LUDWIEG and OSWATITSCH.

In the mixing unit, the primary effect inducing the mixing is turbulence caused by wall friction. If desired, the longitudinal dimensions of the mixing unit may be reduced by superimposing upon the air leaving Laval nozle 2 a suitable twist, this being advantageous for the operation of the diffusors, too.

It will be appreciated that in heat exchanger 10 and adjacent parts pressures up to 800 atmospheres may occur. However, these components will be extremely small, and the maximum temperatures to which they will be subjected will be quite moderate, so the problems usually due to such high pressures may be governed.

For the sake of safety, one may envisage to mount these components in a steel tube reinforced by resin bonded glass fibers, the latter having a foamed plastic lining into which said tube will be inserted.

The recompressing unit 4 is shown in the drawing as having tapering inner body; of course, the equivalent design with outwardly increasing diameter of the external wall is possible and, in practice, perhaps preferable.

In the embodiment as described above, certainly a high-performance air filtering system will be required, such systems being readily available on the market. Further, the filtering system will probably be combined with a suction noise attenuator.

The compressors 7 and 9 with allotted heat exchangers may be replaced by three, four . . . such units, and to indicate this design in the drawing, the lines connecting components 8 and 14 and connecting components 10 and 2, respectively, have been broken. A throttle 15 facilitates the start-up.

Figure 2:
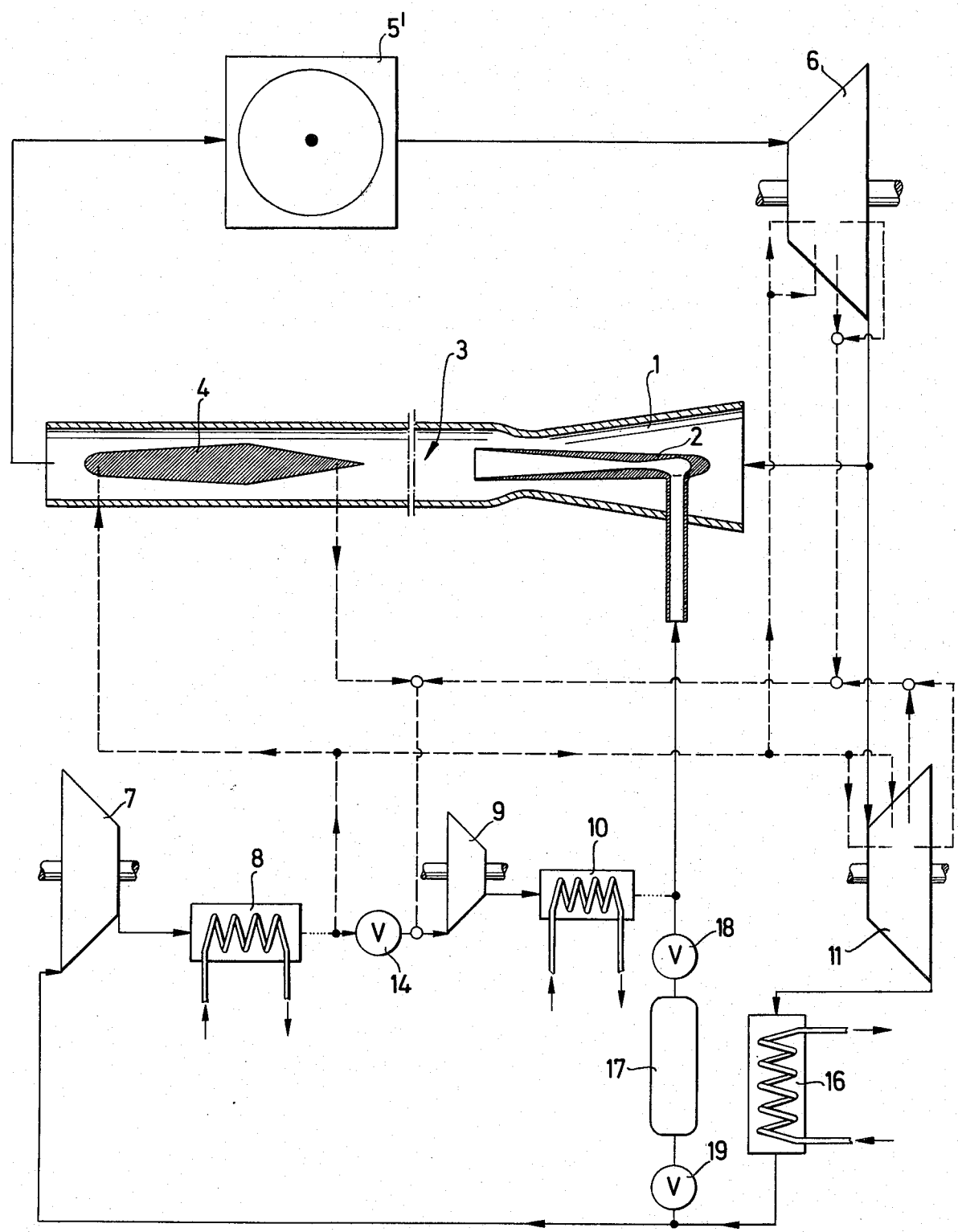
FIG. 2 is a similar block diagram of a second embodiment.

FIG. 2 shows an embodiment with closed loop circuit wherein the operational gas is fed back from discharge turbine 11 to compressor 7 via a cooling heat exchanger 16. The preferred gas is argon because helium requires a complex construction of the compressor components due to its extremely high sound velocity.

The heat source 5' designates a heat exchanger permitting heating of the operational gas by indirect heat exchange with a heating medium. In this embodiment, the heating medium is a liquid metal heated by nuclear energy generated in a nuclear reactor core. The liquid metal, say, plumb of tin, may be replaced by a gas, too, for example, argon. Liquid metal is preferred because it permits use of fast reactors, the core heat exchange surface being smaller than the metal-argon-heat exchange surface.

The cooling heat exchanger 16 may be fed with water as the heat removing medium, the water being taken from a river or being circulated via a cooling tower. 17 designates an argon storage container for power control purposes, a high pressure valve 18 and a lowest pressure valve 19 being provided. Since the circuit is completely closed, the overall efficiency will not substantially vary with the load conditions because, for partial load operation, the pressure level of the lower pressure will vary, too.

In this embodiment, the system pressure data, of course, are quite different from those of the embodiment shown in FIG. 1. For example, under full load condition, downstream compressor 9 there will be about 1000 atmospheres, in heat exchanger 5', there will be 200 atmospheres, and downstream turbine 11, there will be 5 atmospheres. The critical data are for the heat exchanger 5' because therein, the pressure of 200 atmospheres combines with a temperature of, say, 1450° C. These extreme conditions may be resisted, however, by recently developed molybdenum alloys which have values of 40 Kp/mm$^2$ resistance under 1600° C.

Under these pressures ratios of 1000 : 200, a heat transfer from the hot gas to the cold gas just provided which has somewhat extreme values. Therefore, the Laval nozzle 2 is designed as comprising a plurality of units which are disposed in Laval nozzle 1 in such a manner that over their whole length there is already hot gas a Mach figure of 1. The outlet diffursors of nozzles 2 are designed such that they have an outlet angle of about 8° and they are correspondingly longer than would be necessary to achieve the name entrance velocity into the mixing path with a respectively higher cold gas initial pressure. Moreover, the subsonic cold gas duct from heat exchanger 10 to Laval nozzle 2 may be disposed in close thermal contact around mixing path 3 to eliminate argon condensation definitely.

These heat transfer properties affect positively the efficiency. Therefore, they may be provided in the embodiment of FIG. 1, too. The smaller REYNOLDS figures therein due to the much smaller components will result in other optimum conditions, however.

A certain mis-adaption between the flow velocities in the mixing path 3 is allowable. It must be kept in mind, however, that the mis-adaption will result in an additional pressure increase but with efficiencies of about 67%.

What I claim is:
1. A gas turbine circuit system comprising, in combination, a heat source for heating the gas and having a gas inlet and a hot gas outlet, a first turbine having a hot gas inlet and a hot gas outlet, said first turbine inlet being connected to said heat source outlet, said first turbine outlet being connected to said heat source inlet via a gas feed back path, said first turbine providing a hot gas pressure drop of below 10 divided by 1, whereby more than 50% by weight of the hot gas having passed said first turbine is fed back to said heat source inlet, a second turbine having a hot gas inlet and a gas outlet, said second turbine hot gas inlet being connected to said first turbine outlet, said feed back path including: nozzle means fed from said first turbine outlet so to accelerate hot gas passing therethrough, gas mixing means for injecting into the hot gas, having passed said nozzle means, cold gas from compressing means, said cold gas having about the same static pressure and about the same flow velocity and direction as said hot gas from said nozzle already during injection, and recompressing means fed by a gas mixture from said gas mixing means, said recompressing means comprising an oblique shock supersonic compressing head and a diffusor, said gas mixing means comprising at least one Laval nozzle, whereby said gas feed back path provides a pressure increase, hot gas quantities discharged by said second turbine being replaced, in the circuit, by equivalent quantities of cold gas via said compressing means.

* * * * *